G. F. SPEER.
VALVE.
APPLICATION FILED SEPT. 12, 1908.
925,729.
Patented June 22, 1909.
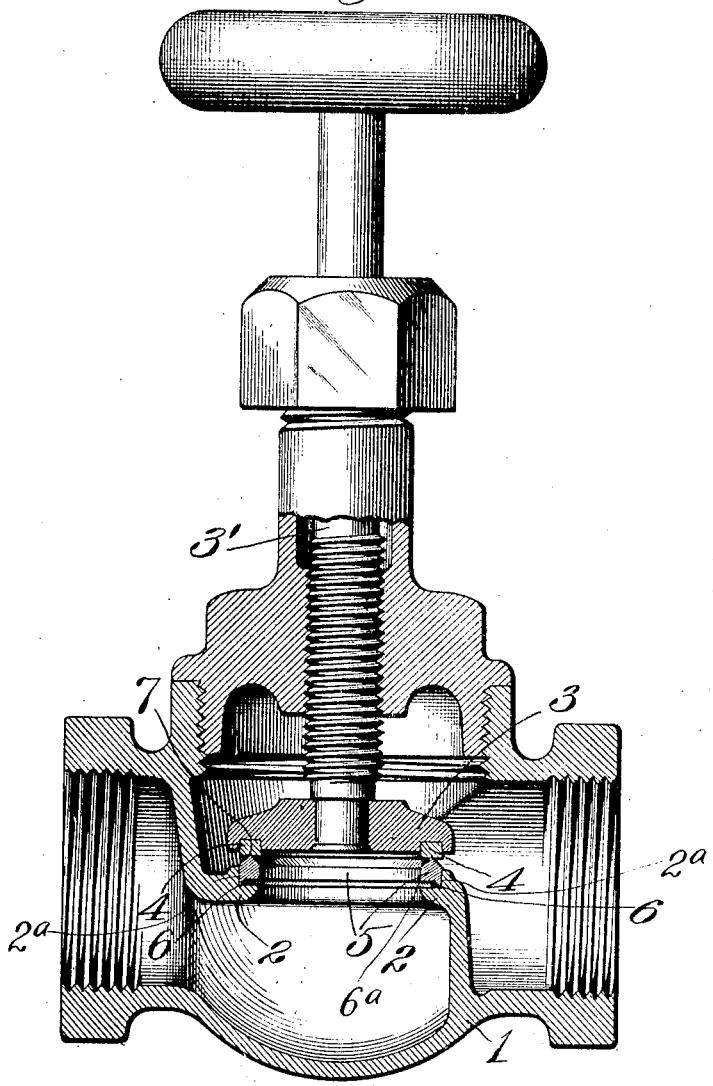
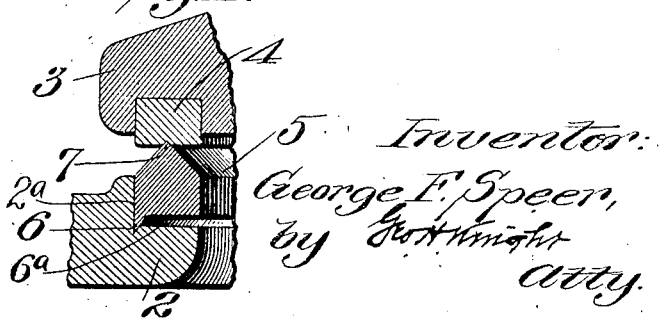
Inventor:
George F. Speer,

UNITED STATES PATENT OFFICE.

GEORGE F. SPEER, OF FORT WORTH, TEXAS.

VALVE.

No. 925,729.  Specification of Letters Patent.  Patented June 22, 1909.

Application filed September 12, 1908. Serial No. 452,691.

*To all whom it may concern:*

Be it known that I, GEORGE F. SPEER, a citizen of the United States of America, residing at Fort Worth, in the county of Tarrant and State of Texas, have invented certain new and useful Improvements in Valves, of which the following is a full, clear, and exact description, reference being had to the accompanying drawings, forming part of this specification.

My invention relates to an improvement in valves and it has for its object the introduction into a valve of a valve seat ring provided with a peripheral cutting or knife edge, formed by an annular rabbet in the inner face of the seat ring extending from its inner wall to said peripheral cutting or knife edge, and that is adapted to embed itself in a softer portion of the annular rabbet formed in the valve seat of the valve for the purpose of providing a fluid tight joint between said ring and the portion of the valve to which said ring is applied.

Figure I is a longitudinal section taken through a globe valve having my improvement incorporated therein. Fig. II is an enlarged section taken through the seat ring and the portions of the valve adjacent thereto.

In the accompanying drawings, I have shown my improvement incorporated in a globe valve, but said improvement may be incorporated with equal advantage in other types of valves.

1 designates the body of my valve which is provided interiorly with a ring seat 2 formed with an annular rabbet 2ª. This ring seat is made of soft metal, such as brass, and the entire valve body with which the ring seat is associated may be of soft metal.

3 is a valve proper that is arranged in opposition to the ring seat 2. This valve proper is provided with a ring seat 4 that is of soft metal, such as brass, and may be in the nature of a ring as illustrated in the drawings, and which is set into the valve proper or may be an integral part of the valve proper in which latter instance the valve proper would be constructed entirely of soft metal. The valve proper is carried by a stem 3' that may be of any suitable construction.

5 designates a seat ring that is located in the annular rabbet 2ª and therefore interposed between the ring seat 2 of the valve body and the ring seat 4 of the valve proper. This seat ring is provided at its inner face with a peripheral knife edge 6 formed by an annular rabbet 6ª in the inner face of the seat ring and that extends continuously throughout the ring and is adapted to fit in and bear against the ring seat 2 into which it is capable of cutting a seat for the peripheral knife edge, as illustrated in Fig. II when pressure is applied to the seat ring by the closing of the valve proper. The seat ring 5 is, in order that the result just mentioned may be secured, made of harder metal than that of which the ring seat 2 is composed, the metal used for the production of said seat ring being preferably steel. It will be apparent that, by causing the peripheral knife edge of the seat ring to enter into the ring seat 2, I am enabled to maintain an absolutely fluid tight joint between these parts. The seat ring 5 is provided at its outer face with a knife edge 7 which is adapted to become embedded in the ring seat 4 of the valve proper by cutting thereinto, whereby a fluid tight joint is effected between said ring seat and seat ring. It will be seen that, as a consequence of the seat ring being provided with both the peripheral knife edge 6 and the outer knife edge 7, the joints between both the outer and inner faces of said ring and the ring seats 2 and 4 which oppose said seat ring, produce a completely fluid-proof valve, and furthermore that this fluid-proof feature of the valve may be continually maintained, due to the entrance of the knife edges of the seat ring into the ring seats.

I claim:

1. In a valve, the combination of a body having a ring seat formed with an annular rabbet, a valve proper having a ring seat, and a seat ring of harder material than the material in the ring seat of said valve body and provided with a peripheral knife edge formed by an annular rabbet in the inner face of the seat ring extending from its inner wall to said peripheral knife edge that is adapted to become embedded in the ring seat of said valve body, substantially as set forth.

2. In a valve, the combination of a body having a ring seat formed with an annular rabbet, a valve proper having a ring seat, a seat ring of harder material than the material in the ring seat of said valve body and provided with a peripheral knife edge formed by an annular rabbet in the inner face of the seat ring extending from its inner wall to said peripheral knife edge that is adapted to become embedded in the ring seat of said valve body, and provided at its face opposite that bearing the peripheral knife edge with a knife edge adapted to become embedded in the ring seat of said valve proper, substantially as set forth.

GEO. F. SPEER.

In the presence of—
C. L. ROBISON,
J. M. DOLEN.